Feb. 12, 1952     G. R. NEWLON, JR     2,585,343
FLANGE HOLDING CLAMP

Filed July 1, 1947     2 SHEETS—SHEET 1

Inventor

George R. Newlon, Jr.

By *Clarence A. O'Brien and Harvey B. Jacobson*
Attorneys

Feb. 12, 1952     G. R. NEWLON, JR     2,585,343
FLANGE HOLDING CLAMP
Filed July 1, 1947     2 SHEETS—SHEET 2

Inventor
George R. Newlon, Jr.
By *Clarence A. O'Brien and Harvey B. Jackson*
Attorneys Patented Feb. 12, 1952

2,585,343

UNITED STATES PATENT OFFICE 2,585,343

FLANGE HOLDING CLAMP

George R. Newlon, Jr., Point Pleasant, W. Va.

Application July 1, 1947, Serial No. 758,373

4 Claims. (Cl. 33—180)

The present invention relates to new and useful improvements in clamps for holding the face of a slip-on welding flange true with a pipe until the flange has been welded to the pipe.

An important object of the invention is to provide means for accurately welding flanges on a pipe and designed for use with pipes and flanges of various sizes.

A further object is to provide a flange holding clamp which may be readily adjusted on the pipe and which is easily and quickly secured in position to a pipe with a minimum of effort.

A still further object of the invention is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
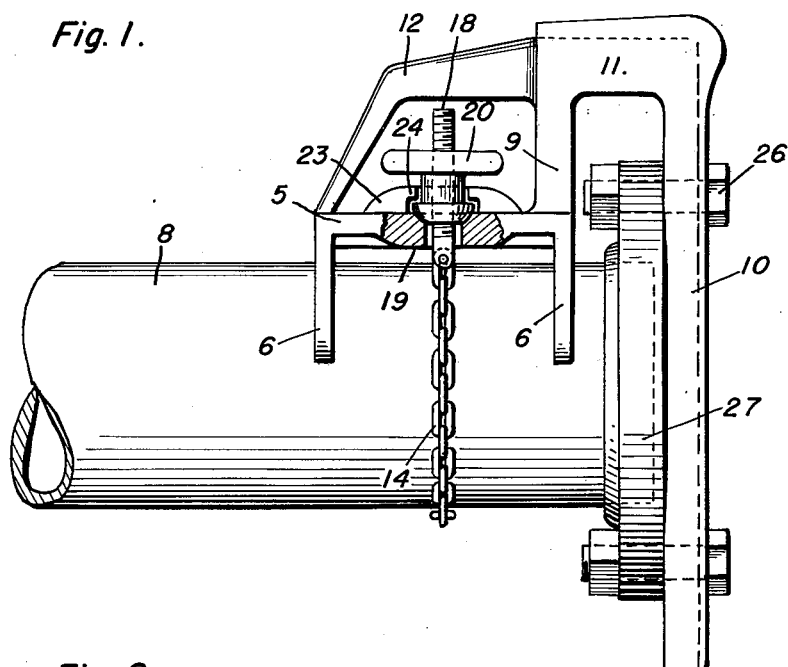
Figure 1 is a side elevational view with parts broken away and shown in section.
Figure 2:
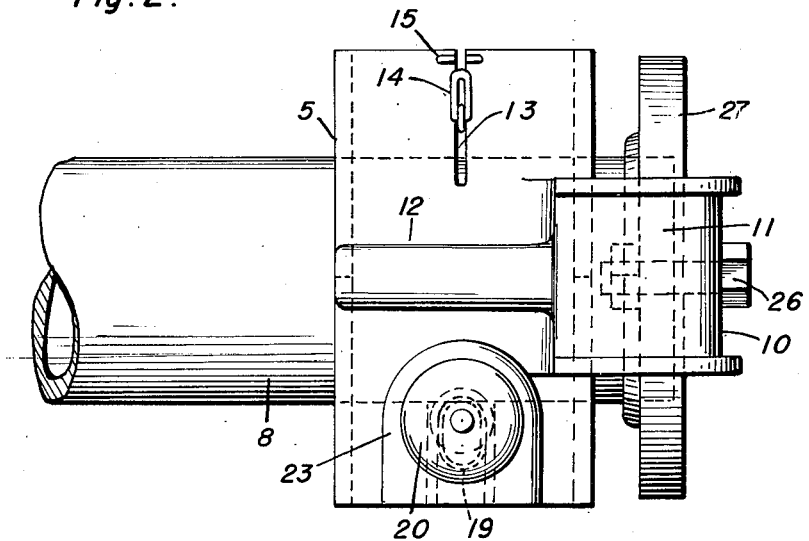
Figure 2 is a top plan view.
Figure 3:
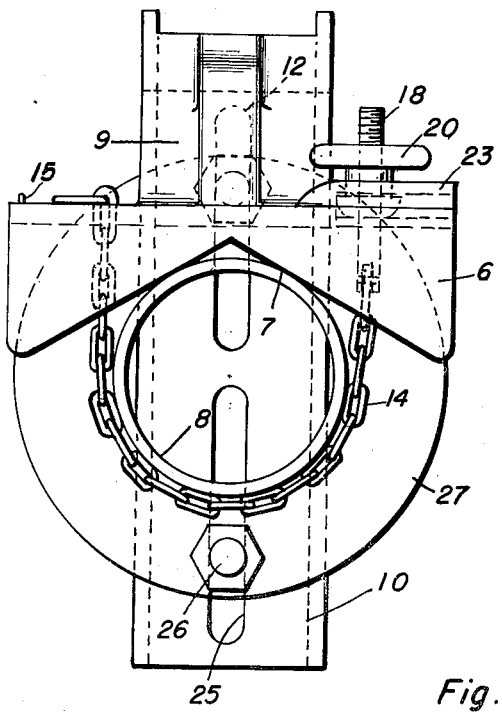
Figure 3 is a rear elevational view.
Figure 4:
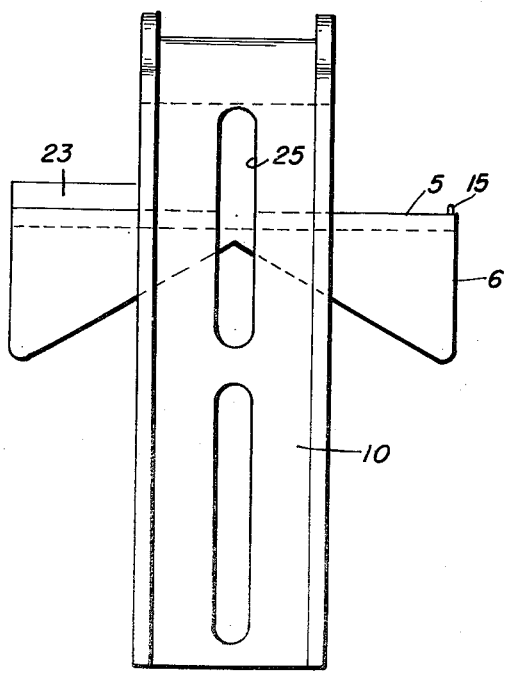
Figure 4 is a front elevational view showing the clamp removed from the pipe.
Figure 5:
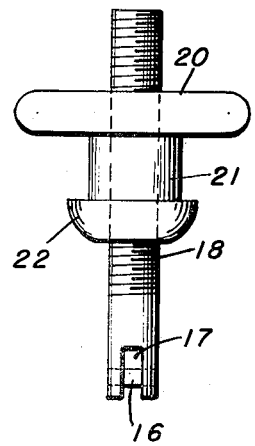
Figure 5 is an enlarged view in elevation of the chain tightening wheel.

Referring now to the drawings in detail, wherein for the purpose of illustration I have disclosed a preferred embodiment of the invention, the numeral 5 designates an inverted channel-shaped base to provide spaced parallel flanges 6 formed with a V-shaped notch 7 for seating on a pipe 8.

At the front edge of the base 5 is an upstanding support 9 to which a leg 10 is integrally cast by a connector 11 joining the upper ends of the support 9 with the upper end of the leg 10 to space the leg forwardly of the front edge of the base and to extend downwardly in front of the pipe 8. The upper edge of the support 9 is connected to the rear edge of the base by a brace 12 positioned at the center of the base.

One side edge of the base 5 is formed with an inwardly extending slot 13 in which one end of a chain 14 is anchored and retained in position against slipping outwardly at the end of the slot by lugs 15 projecting from the surface of the base at each side of the slot adjacent its outer end.

The chain 14 extends downwardly under the pipe 8 and is attached at its other end to a pin 16 extending transversely of the bifurcated lower end 17 of a screw 18, the screw being freely positioned in an opening 19 in the base at its side opposite from the slot 13.

A chain tightening wheel 20 is threadedly carried on the screw 18 and includes a collar 21 extending downwardly from the wheel and formed with a flange 22 at its lower end.

The chain 14 is tightened by rotating the wheel 20 and the wheel is held against vertical movement to feed the screw upwardly through the wheel during the tightening action, the wheel being prevented from moving upwardly by means of retaining lugs 23 carried by the base 5, the lugs 23 having opposing portions 24 overlying the flange 22.

The leg 10 is formed with one or more vertical slots 25 to receive bolts and nuts 26 and in the operation of the device a flange 27 is slipped over the end of the pipe 8 and the base 5 placed in position on the pipe with the leg 10 positioned vertically outwardly of the flange and the chain 14 tightened by the wheel 20. The bolts 26 are inserted through the openings usually provided in the flange and the bolts adjusted in the slots 25 to center the flange on the pipe whereupon the same may be tack welded to securely hold the flange to the pipe.

The bolts 26 and clamp are then removed from the pipe and the welding of the flange may then be completed.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A flange holding clamp for assembling a flange on a pipe and comprising an inverted channel-shaped base including a pair of parallel flanges having aligned V-shaped notches therein for seating on a pipe, said base including a front edge and a rear edge, a support fixed to and rising from the front edge of the base, a leg paralleling the flanges of said base and having a laterally projecting connector at its upper end integrally formed with said support, said leg extending considerably below the flanges of said base and being sufficiently long to extend completely diametrically across a flange supported thereon, a brace connecting the support to the rear edge of said base to further reinforce and strengthen the clamp, said leg having upper and lower longitudinal slots, fasteners slidably adjustable in the slots for securing a flange to and against the leg, said base having a slot therein paralleling said flanges, a chain having one end received in the slot, and means carried by the base and engaging the other end of the chain to tighten the latter about a pipe seated in said notches and thereby retain the pipe in the notches.

2. The combination of claim 1 wherein said means comprises a screw attached at one end to one end of the chain, said base having an opening accommodating the screw, said opening including a concaved upper end, and a hand wheel threaded on said screw and having a flange at one end, the flange of said wheel including a convexed surface rotatably positioned in the concaved upper end of said opening.

3. The combination of claim 2 and means retaining the flange of said wheel in the concaved upper end of said opening.

4. The combination of claim 3 wherein said retaining means comprises a pair of lugs on the upper face of said base, said lugs having opposing portions overlying the flange of said hand wheel.

GEORGE R. NEWLON, Jr.

REFERENCES CITED

The following references are of record in the file of this patent:

UNITED STATES PATENTS

| Number | Name | Date |
|---|---|---|
| 801,222 | Corcoran | Oct. 10, 1905 |
| 1,848,527 | Hickey | Mar. 8, 1932 |
| 1,928,892 | Hickey | Oct. 3, 1933 |
| 1,940,910 | Hickey | Dec. 26, 1933 |
| 2,461,783 | Stark | Feb. 15, 1949 |